United States Patent

Maloberti

[11] Patent Number: 5,526,846
[45] Date of Patent: Jun. 18, 1996

[54] STIFFENER WITH REINFORCED STRUCTURE

[75] Inventor: René Maloberti, Champigny, France

[73] Assignee: COFLEXIP, France

[21] Appl. No.: 363,986

[22] Filed: Dec. 27, 1994

Related U.S. Application Data

[63] Continuation of Ser. No. 920,298, Oct. 21, 1992, abandoned.

[30] Foreign Application Priority Data

Dec. 26, 1990 [FR] France ................... 90 16276

[51] Int. Cl.⁶ .................................................. F16L 55/12
[52] U.S. Cl. ........................................... 138/109; 138/174
[58] Field of Search ............................. 138/103, 109, 138/110, 174; 285/138, 149

[56] References Cited

U.S. PATENT DOCUMENTS

| | | | |
|---|---|---|---|
| 2,487,554 | 11/1949 | Hurst | 138/110 |
| 2,571,578 | 10/1951 | Maelen | 138/109 |
| 3,831,635 | 8/1974 | Burton . | |
| 4,103,713 | 8/1978 | Haylock | 138/109 |
| 4,126,157 | 11/1978 | Roest | 138/109 |
| 4,366,842 | 1/1983 | Peavy et al. | 138/109 |
| 4,367,967 | 1/1983 | Albert, Jr. . | |
| 4,467,836 | 8/1984 | Ragout | 138/109 |
| 4,794,957 | 1/1989 | Metzler, Jr. . | |
| 4,895,185 | 1/1990 | Champleboux et al. | 138/109 |

FOREIGN PATENT DOCUMENTS 2040014  8/1980  United Kingdom .

OTHER PUBLICATIONS

International Search Report for PCT/FR91/01073, 22 Apr. 1992.

Primary Examiner—James E. Bryant, III
Attorney, Agent, or Firm—Hoffman, Wasson & Gitler

[57] ABSTRACT

Stiffener comprising an elastic member made of elastomer which surrounds a elongate body to be stiffened, the elastic member being integrally attached to one end of a housing support.

It comprises, inside the elastic material (4), a reinforcement (8) extending over a portion of the length of the elastic member (4) from the end, the reinforcement being integrally attached by fastening (7) to the housing support (2, 6).

14 Claims, 8 Drawing Sheets

STIFFENER WITH REINFORCED STRUCTURE

This is a continuation of application Ser. No. 07/920,298 filed on Oct. 21, 1992 now abandoned.

The present invention relates to a stiffener which has a reinforced structure.

There exist various types of elongate bodies of great length in relation to their diameter and exhibiting a high strength and a high axial stiffness as opposed to a low flexural stiffness. Examples of such elongate bodies which may be mentioned are flexible tubular conduits for conveying fluids, for example hydrocarbons, umbilicals, reinforced electrical cables or anchoring cables. Bodies of these types will be called elongate bodies in the continuation of this patent.

The elongate bodies can be damaged by flexing or by repeated flexing if they have a radius of curvature which is too small. This makes it necessary to impose a minimum radius of curvature on the elongate bodies. One of the techniques for imposing a minimum radius of curvature on elongate bodies consists in equipping them with stiffeners on the portion of the elongate body liable to be subjected to the flexing which may cause its deterioration. This portion corresponds, for example, to the connection to a terminal of a vertical flexible tubular conduit for bringing up hydrocarbons in the case of an offshore oil production platform.

A first example of stiffener of known type is a cone made of polyurethane overmolded around the end of an elongate body and its terminal. The molding is performed with heating. The polymerization of the polyurethane causes a shrinkage which produces a constriction and binding of the terminal by the stiffener. The binding improves the adherence of the stiffener to the terminal. This adherence can be increased by a surface treatment of the terminal, for example, by the presence of asperities or grooves on the latter.

However, a stiffener of this type has many disadvantages.

First of all, the stiffener is molded directly around a terminal of a terminated flexible tubular conduit. Thus, a problem which arises during the overmolding of the stiffener may damage the flexible tubular conduit itself, and this is an extremely expensive product. This risk is not negligible, all the more so since the stiffeners of known types have enormous masses, for example 900 kg (of polyurethane). In the case where only the stiffener has been badly made without, however, damaging the flexible tubular conduit, it is still necessary to destroy the stiffener to release the flexible tubular conduit with a view to the molding of a new stiffener. The destruction of a stiffener of several hundred kilograms of polyurethane is a long and costly operation. This is all the more so since it is necessary to take all the precautions which are essential in order not to damage the flexible tubular conduit during this operation. All these handling operations are not carried out in hidden time, that is to say that it is impossible to perform them at the same time as the manufacture of the flexible tubular conduit. Thus, the production of the stiffener gives rise to an incompressible delay, increasing the time needed for the production of a flexible tubular conduit equipped with a stiffener.

Furthermore, the stiffener of known type exhibits a lack of rigidity at the housing, reflected in a decrease in performance, that is to say a local decrease in the radius of curvature. The lack of rigidity at the housing has resulted in the production of greater thicknesses at the housing in the case of stiffeners of the known type. These greater thicknesses increase the bulk and the cost of manufacture-and of handling of these stiffeners.

Various solutions have been proposed to overcome the problems of these stiffeners.

First of all, the polyurethane cone of the stiffener is manufactured and is threaded onto the flexible tubular conduit before the terminal is fitted. The fitting of the terminal is then performed. The stiffener is slid so that it surrounds the fitted terminal.

This embodiment no longer makes it possible to have the benefit of the constriction of the stiffener around the terminal with the resulting binding action of the shrinkage of the polyurethane around the terminal. In addition, it is no longer possible to produce scoring or grooves around a terminal which is always of substantially cylindrical shape. The absence of binding increases shear stress concentrations between the stiffener and the terminal and consequently the risk of fatigue cracking, bearing in mind the lifetime which is from 5 to 20 years in practice.

An embodiment of the stiffener which gives higher performance consists in overmolding the polyurethane stiffener around an insert which has an internal shape corresponding to the external shape of the terminal. Binding effects of the polyurethane around the insert are thus obtained, with the possibility of fitting with a minimum clearance between the stiffener and the terminal. The terminal-insert contact can be obtained under good conditions, insofar as it is a metal-to-metal contact. The device of known type can be disassembled and produced in hidden time, which permits checking and limits the handling operations of the finished product.

However, the housing of the stiffener onto the terminal has still not been optimized.

The objective of the present invention is to increase the rigidity to flexure of the stiffener housed on its support.

The subject of the present invention is a stiffener comprising an elastic member made of elastomer which surrounds an elongate body to be stiffened, the said elastic member being integrally attached to one end of a housing support, which stiffener comprises, inside the said elastic material, a reinforcement extending over a portion of the length of the elastic member from the said end, the said reinforcement being integrally attached by means for fastening to the said housing support.

The present invention is based on the finding that the housing of the stiffener, for example at the terminal, exposes the material of the stiffener to tensile-compressive stresses and that an improvement in performance can be obtained by equipping the stiffener with devices capable to share, with a negligible deformation, the axial tensile stresses caused by the flexing of the elongate body.

A "housing" is intended to mean a mechanical connection which is rigid especially in flexure, translation and rotation between the stiffener and a housing support.

The housing support consists of a structure or of a structural component, to which the stiffener is integrally attached, the said housing support being relatively stationary in relation to the elongate body. In absolute terms, the housing support may be either stationary, that is to say bonded to an immobile external support, or mobile.

In the case of a flexible tubular conduit the housing support may include the terminal of the conduit.

The housing of the stiffener onto the housing support can be direct. For example, the stiffener can be housed around a terminal, its inner wall is directly housed around the terminal. This housing advantageously uses an insert which constitutes a part of the inner wall of the stiffener and whose internal shape corresponds to the external shape of the terminal.

According to the invention the stiffener can be fitted onto the housing support without any insert. In this case the stiffener is molded around the elongate body with a very small, preferably nil, radial clearance.

The housing can also employ intermediate housing means. The housing support may include a rigid tube surrounding a flexible tubular conduit with a clearance, over a portion of its length. The housing support can comprise an arm which is integrally attached to an oil production surface platform.

The deformations of the elongate body can be static or dynamic, for example due to the action of the swell and current, or as a function of the displacements of the mobile external support to which the housing support is attached. The housing support may comprise a member fitted directly and rigidly on the elongate body. For example, it comprises a terminal fitted to the end of the part to be stiffened of the elongate body, or a collar clamped on the elongate body. The housing support may also comprise a structure Which is distinct and separate from the elongate body. In this latter case the housing support may comprise inserted housing members which ensure an integral attachment of the stiffener to the housing support.

The stiffener according to the present invention can additionally comprise an external bushing surrounding it over a portion of its length, this bushing being integrally attached to the housing support.

BRIEF DESCRIPTION OF THE DRAWINGS

The invention will be understood better by means of the description below and of the attached figures which are given as non limiting examples, among which.

DETAILED DESCRIPTION OF THE INVENTION

Figure 1:
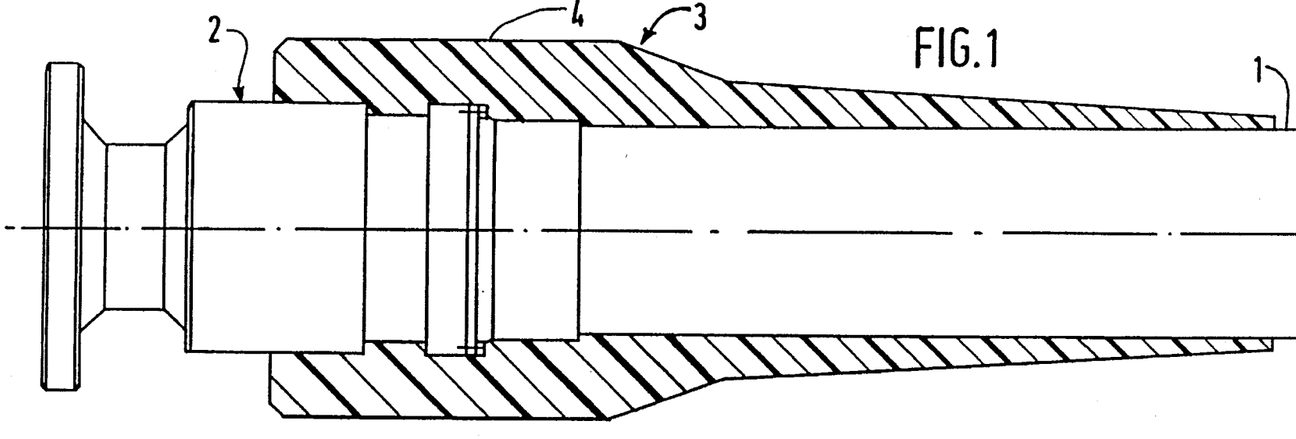
FIG. 1 is a view in lengthwise section of a first example of embodiment of a stiffener of known type, fitted on a conduit provided with a terminal.

FIG. 1 shows a stiffener 3 of known type fitted at a terminal 2 on an elongate body 1 such as a tubular conduit. The stiffener 3 of FIG. 1 consists of a polyurethane jacket 4 overmolded around a portion of the terminal 2 and of the elongate body 1. The diameter of the stiffener decreases proportionally as one moves away from the terminal 2. In this case the terminal 2 forms a housing support.

Figure 2:
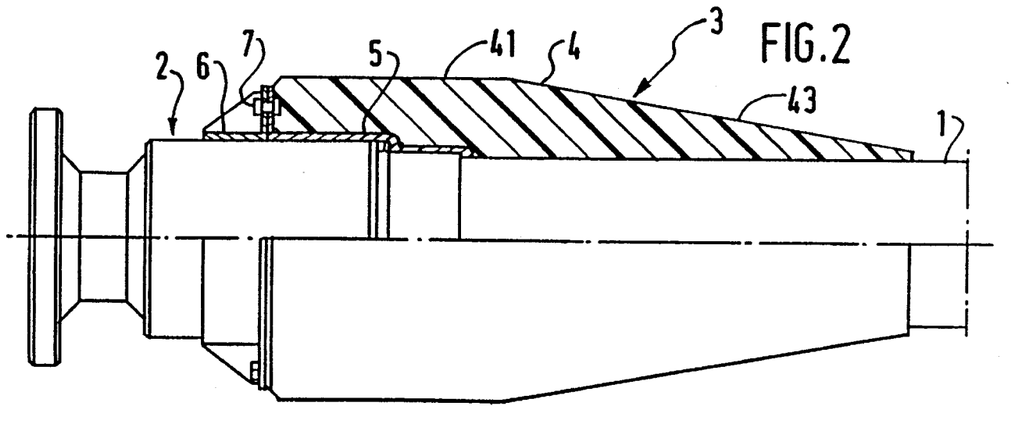
FIG. 2 is a similar view of a second example of embodiment of a stiffener of known type, fitted on a conduit provided with a terminal.

FIG. 2 shows an alternative form of embodiment of a stiffener 3 of known type. The stiffener 3 of FIG. 2 comprises an elastic member 4 made of polyurethane molded around a metal insert 5 reproducing the external shape of the terminal 2. The insert 5 is integrally attached to the terminal advantageously by additional housing means welded to the terminal and comprising a flange 6, by means of fastening members 7 such as screws and nuts.

The elastic member 4 comprises a rear, for example cylindrical, part 41 corresponding to the region of housing of the stiffener onto the terminal 2, and a so-called active frustoconical part 43 which surrounds the elongate body with a minimum clearance over a length corresponding to the critical region where the curvature must be limited, so that the radius of curvature of the elongate body cannot become smaller than the fixed limit. In an alternative form the elastic member 4 may comprise a cylindrical part 41 whose thickness has been increased to improve the housing, extended by a frustoconical part of steeper slope 42, providing the transition between the cylindrical part and the active frustoconical part 43, as in the embodiments of the invention which are illustrated in FIGS. 3b and 4b.

Figure 3A:
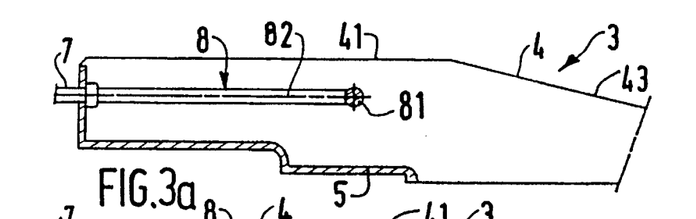
FIGS. 3a and 3b are partial views of two alternative forms of a first example of embodiment of a stiffener according to the present invention.
Figure 3B:
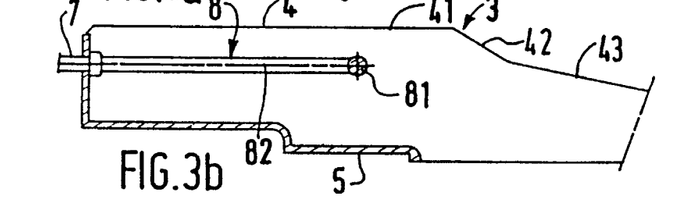

FIGS. 3a and 3b show two alternative forms of a first example of embodiment of a stiffener 3 according to the present invention. An elastic member 4 surrounds an elongate body 1. The work is done in the elastic range of the material, that is to say that in the case of constraints being removed the member 4 returns substantially to its initial state. The elastic member 4 is made of a moldable elastomer. An elastomer with a high Young's modulus is advantageously employed, and this minimizes the dimensions needed to guarantee a minimum radius of curvature for a given constraint. An elastomer exhibiting a high elongation at break of several hundred percent, is advantageously employed. An elastic polyurethane is advantageously employed. The elastic polyurethane advantageously has a hardness of between 60 and 95 Shore A, typically 90 to 95 Shore A. In an example of embodiment the elastic member consists of a polyurethane whose elongation is between 10 and 15% in the case of the maximum loads imposed; it being possible for the polyurethane employed to undergo elongations of 400% without rupture. This polyurethane has a hardness which is substantially equal to 95 Shore A. The increase in the hardness of the polyurethane increases the shrinkage on casting and the rate of polymerization. A lower hardness increases the dimensions of the stiffener and the quantity of the elastic material which is employed.

The stiffeners illustrated exhibit one of the two external shapes referred to above.

It is obvious that the present invention is not limited to the use of a housing part 41, of an active part 43 and, where appropriate, of a connecting part 42 whose outer surface exhibits a shape of revolution which is cylindrical and conical respectively, as described above. Thus, for example, the housing part 41 can be slightly conical, the active part 43 can have some curvature, concave or convex, over the whole or part of its length, or can include a cylindrical part. Similarly, the lengths of the cylindrical and conical parts respectively can vary; but, in an advantageous embodiment, the end of the cylindrical part has its connection to the conical part which is situated approximately at, or slightly beyond the end of the insert, or of the member such as a terminal or the bushing 9 described later with reference to FIGS. 4a and 4b, or a tube outside the stiffener on which or in which the elastic member 5 is housed so as to have a preferably cylindrical housing bearing whose length is preferably approximately equal to the length of the cylindrical housing part 41.

The stiffener according to the present invention comprises an internal reinforcement for increasing the flexural rigidity and providing a high proportion of the resistance to the tensile and compressive axial stresses which affect the stiffener when the elongate body is flexed.

This reinforcement takes up most of the axial tensile-compressive stresses and limits the deformations of the member made of elastomer when the elongate body is flexed.

In the example of FIGS. 3a and 3b the reinforcement 8 is made up of a toroid ring 81 held axially by a plurality of tie rods 82, preferably parallel to the axis of the elongate body and advantageously concentric and uniformly distributed over 360°. The tie rods 82 are integrally attached by fastening means, for example by welding or comprising mechanical fastening members 7 such as, for example, a set of screws and nuts, to a housing support. The stiffener 3 advantageously comprises a preferably metal, for example steel, insert 5.

In the case where the stiffener 3 is arranged, in its housing part 41, around a member such as a terminal 2 (not illustrated in FIGS. 3a and 3b), forming the housing support with housing means such as those illustrated in FIG. 2, it is advantageous to produce the insert 5 with an internal shape reproducing substantially the outer contour of the terminal. In the embodiments illustrated the fastening members 7 are integrally attached to a radial annular member, for example in the shape of a disc which forms an extension of the insert 5 or which is produced in the form of an independent member integrally attached to the insert 5. This arrangement makes it possible to ensure a good overall mechanical cohesion between the reinforcement 8, the housing support and the insert 5, which increases the rigidity of the housing.

Furthermore, it has been found that the radial member extending the insert improves the rigidity of the stiffener by forming a wall which limits the deformations of the elastic member 4.

The presence of the reinforcement 8 enables the flexural rigidity to be increased at the housing of the stiffener. The reinforcement makes it possible to absorb at least the differential axial stresses between the compressed side and the stretched side, which generate shearing forces. The main function of the reinforcement 8 is to increase the stiffness of the elastic member 4 at the housing. In particular, it has been found that the reinforcement 8 reduces the curvature of the elongate body in its region in which the curvature is the greatest, that is to say in the conical active region 43 of the elastic member, and does so even though, in the advantageous embodiments illustrated, the reinforcement 8 is arranged in the cylindrical housing part 41 without encroaching on the active part 43.

Astonishingly, by virtue of a reinforcement which in itself does not exhibit any appreciable flexural strength, the invention makes it possible to impart a high flexural strength to the assembly consisting of the elastic member containing the reinforcement and the elongate body onto which the elastic member is fitted.

Figure 4A:
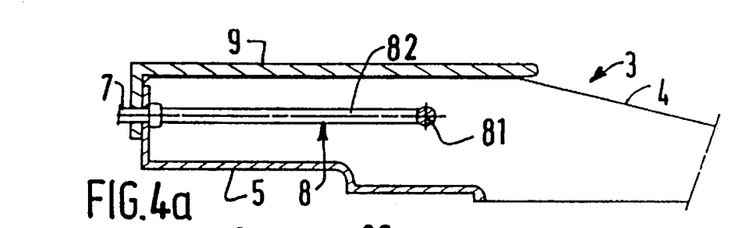
FIGS. 4a and 4b are partial views of two alternative forms of a second example of embodiment of a stiffener according to the present invention.
Figure 4B:
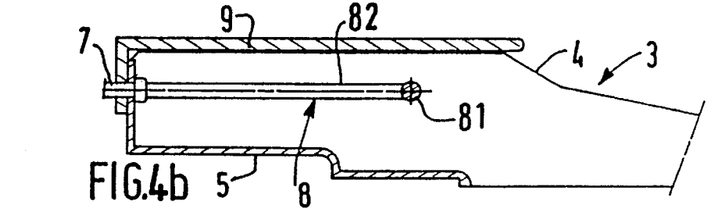

FIGS. 4a and 4b show two alternative forms of another embodiment of the stiffener 3 according to the present invention, additionally comprising a bushing 9 arranged at the periphery, and preferably over the entire length of the cylindrical housing part 41 of the elastic member 4. The bushing 9 is integrally attached to a housing support, not shown, by means of fastening members 7. In addition, in the example of FIG. 5, the bushing is integrally attached to an insert 5 surrounding a terminal, not shown, the bushing having a disk-shaped radial annular part which is connected by clamping of the fastening members 7 to the radial member extending the insert.

The stiffener of FIGS. 4 and 4b is advantageously produced by molding an elastomer, for example polyurethane, which is to form the elastic component 4, the molding being preferably carried out around the insert, and members making up the reinforcement 8 being installed. The polyurethane is then polymerised. The reaction, which is exothermic, is followed by cooling. A shrinkage of the polyurethane then takes place and causes binding around the insert 5 and at the same time has the effect of creating an interstice between the molded elastic member 4 and the mold, it being possible for the external bushing 9, in an advantageous embodiment, to be fitted around the elastic member after the polyurethane shrinkage. The interstice between the bushing and the molded elastic member is advantageously filled, for example by again casting polyurethane therein, the operation being supplemented by the definitive polymerization of the polyurethane components. In an alternative form the external bushing 9 can be employed as an outer mold member.

The elastic member 4 is thus contained in its cylindrical housing part 41 between the two concentric surfaces of the insert 5 and of the bushing 9. However, there is no adherence between the elastic member 4 and the bushing 9. When the elastic member 4 flexes, a clearance appears on the stretched side, between the bushing 9 and the elastic member 4; on the compressed side the bushing 9 forms a shoulder enabling the rigidity of the elastic member 4 to be increased at its housing. Radial member extending the insert and the bushing respectively preferably form an additional continuous supporting surface for the elastic member 4, the cylindrical housing part 41 being thus situated in a closed volume, and this contributes to increasing the rigidity of the stiffener 3.

The stiffeners 3 in FIGS. 4a and 4b, which comprise the reinforcement 8 of the stiffener illustrated in FIGS. 3a and 3b and a bushing 9 exhibit excellent housing characteristics. The stiffener exhibits only a relatively low level of stress concentration around the annular part 81 of the reinforcement 8, and the result of this is that the constituent-materials of the stiffener subjected to dynamic stresses have their lifetime extended. In addition, it thus becomes possible to decrease the volume of the elastic component 4 while making sure that the elongate body to be protected will never be subjected to flexing which has a radius of curvature smaller than the imposed limit. In particular, when the housing stresses and/or dynamic stresses are considerable, the stiffener according to the invention can be produced with a much greater rigidity than the stiffeners of known type, this being without requiring excessive dimensions, and this makes it possible to increase the radius of curvature and the service lifetime of the elongate body.

It is obvious that the reinforcement 8 of the elastic member 4 is not limited to the form of a toroid ring 81 held by tie rods 82. It is only imperative that it must be anchored to the housing support and that it does not cut out concentric crown rings in the elastic member 4, that is to say that it allows radial connections to remain.

Other exemplary embodiments of reinforcements are illustrated in FIGS. 5 to 8.

Figure 5:
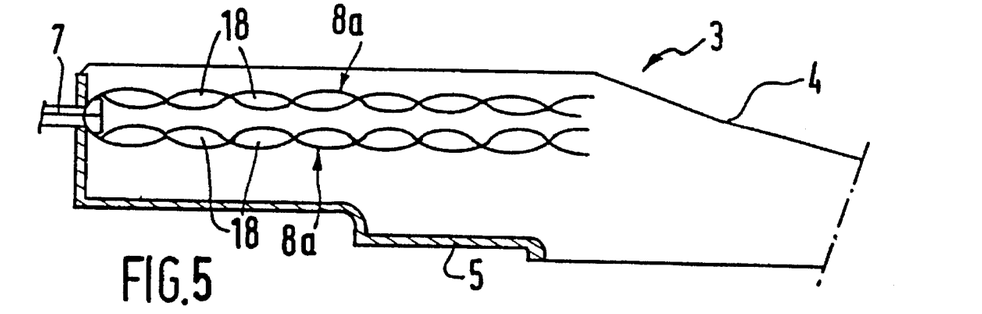
FIG. 5 is a partial view of a third example of embodiment of a stiffener according to the present invention.

FIG. 5 shows a reinforcement 8a made up of two concentric sheets of interwoven yarns or ribbons, for example woven or braided ones, comprising meshes which are embedded in the elastic member 4. The elastomer passes through the sheets at the openings 18 of sheets, and this prevents the member 4 from being cut into concentric crown rings.

Figure 6:
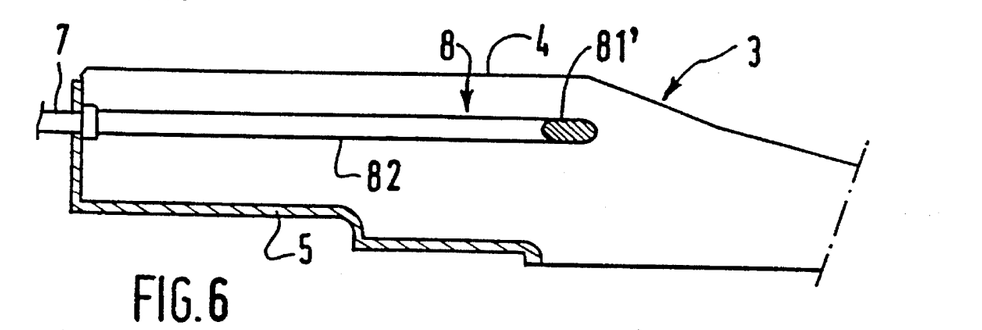
FIG. 6 is a partial view of a fourth example of embodiment of a stiffener according to the present invention.

In the example illustrated in FIG. 6 the reinforcement 8 is a ring 81 of elliptical section held by tie rods 82, advantageously uniformly distributed over 360°. In the example illustrated in FIG. 6 the tie rods 82 have a greater length than those used in the examples of FIGS. 3a to 4b, the length of the tie rods of FIG. 6 being substantially equal to the length of the cylindrical part of the elastic member 4. The major axis of the ellipse is advantageously parallel to the axis of the stiffener 3. As a general rule, the use of a ring centered on the axis of the stiffener 3 and with a section which is elongate parallel to this axis is found to be advantageous. However, stiffeners containing a reinforcement comprising a ring whose section has a radial span which is greater than the span in parallel to the axis of the stiffener do not depart from the scope of the present invention.

Figure 7:
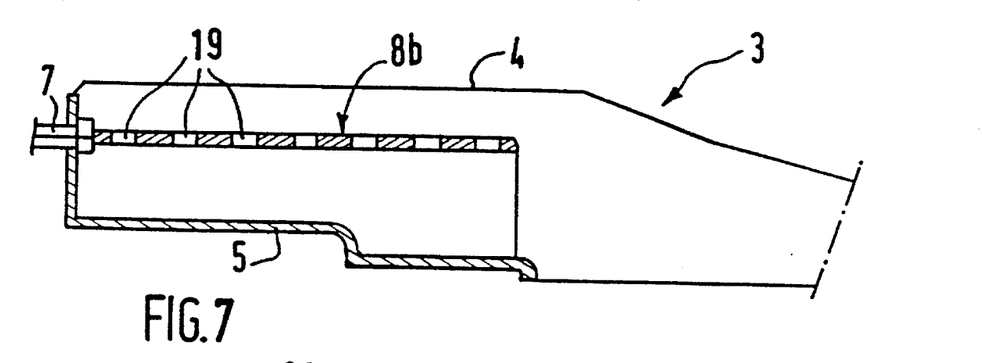
FIG. 7 is a partial view of a fifth example of embodiment of a stiffener according to the present invention.

FIG. 7 shows an example of reinforcement 8b which has the shape of a thin cylindrical sleeve. The sleeve 8b comprises openings 19 filled with the constituent material of the elastic member 4.

Figure 8:
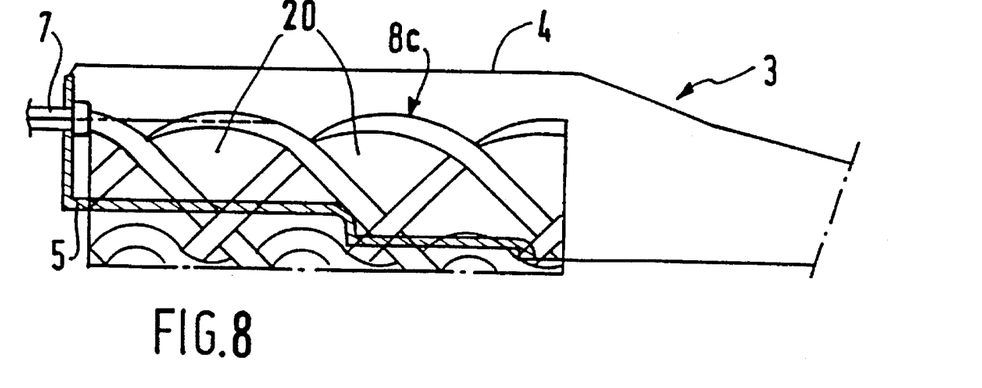
FIG. 8 is a partial view of a sixth example of embodiment of a stiffener according to the present invention.

FIG. 8 shows a stiffener comprising a reinforcement 8c formed by a loose grid forming a cylindrical crown ring. In the example illustrated in this figure the reinforcement 8c comprises tapes arranged into helices, intersecting substantially at 90°. The ends of the tapes are fastened by means of the fastening members 7. Openings 20 allow radial connections to be made in the elastic member 4.

In the case of all the embodiments of the internal reinforcements which are illustrated the length of the reinforcement in parallel to the axis of the elongate body is smaller than or equal to the length of the stiffener. Advantageously, it can be approximately equal to the length of the housing region (cylindrical part) 41 of the elastic member 4, or slightly shorter.

The internal reinforcements and, if appropriate, the external bushing can be made of any material which has the required mechanical strength. In particular, they can be made of metal or plastic and/or may comprise reinforcing fibers.

In particular, the ring 81 and the tie rods 84 of the internal reinforcements 8 and the bushings 9 may be advantageously made of steel.

The components of the internal reinforcements such as yarns or ribbons which are interwoven in FIG. 5, spiraled into a grid in FIG. 8 or such as the perforated sleeve of FIG. 7 can be advantageously made of a material comprising fibers such as, for example, glass fibers, carbon fibers or aramid fibers such as those sold by the company Du Pont de Nemours under the trademark Kevlar. The fibers are either directly embedded in the constituent material of the elastic member 4 or are themselves coated with a resin and assembled in the form, for example, of yarns, ribbons or membranes.

Figure 9:
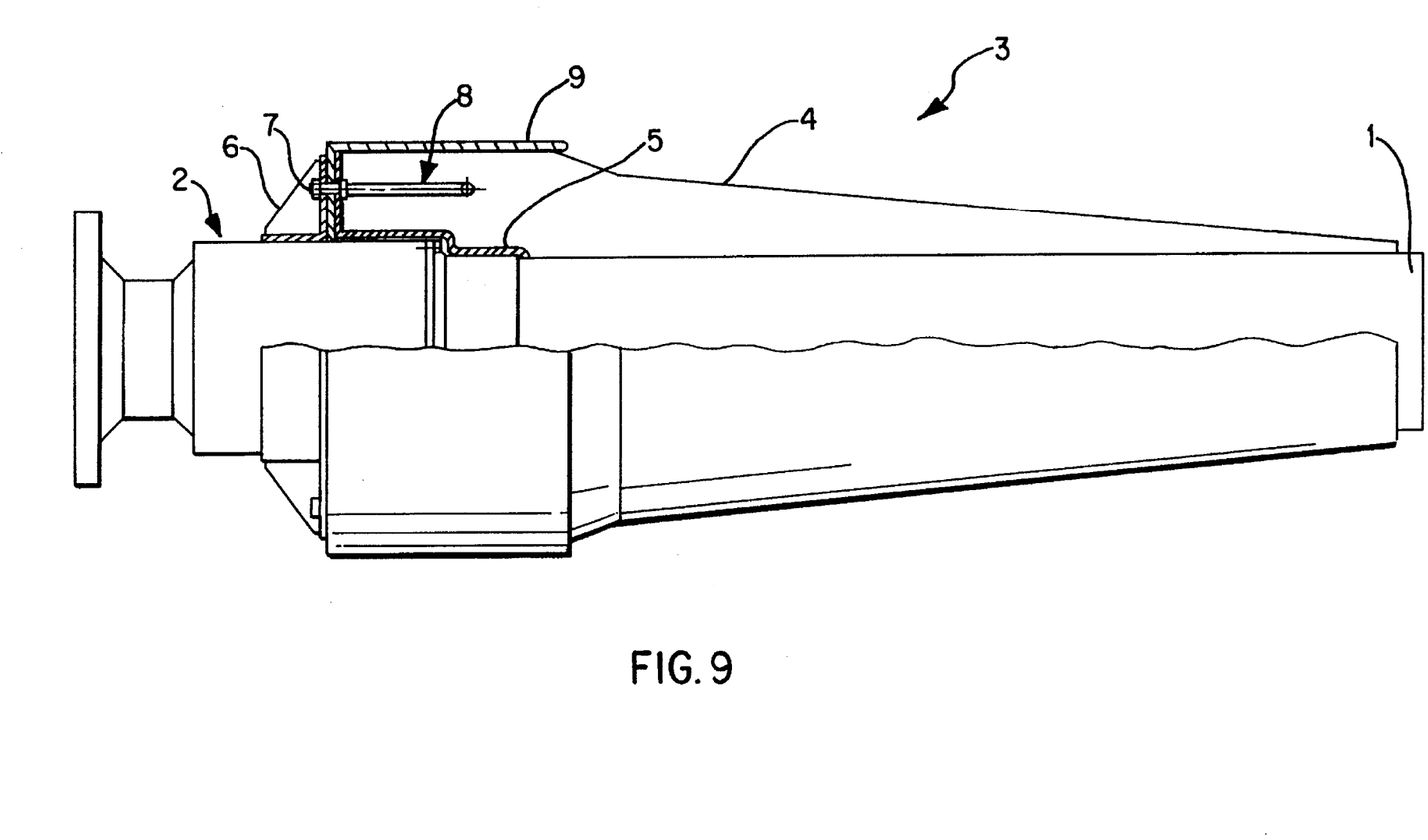
FIG. 9 is a view in lengthwise section of the stiffener of FIG. 4, fitted on a conduit provided with a terminal.
Figure 10:
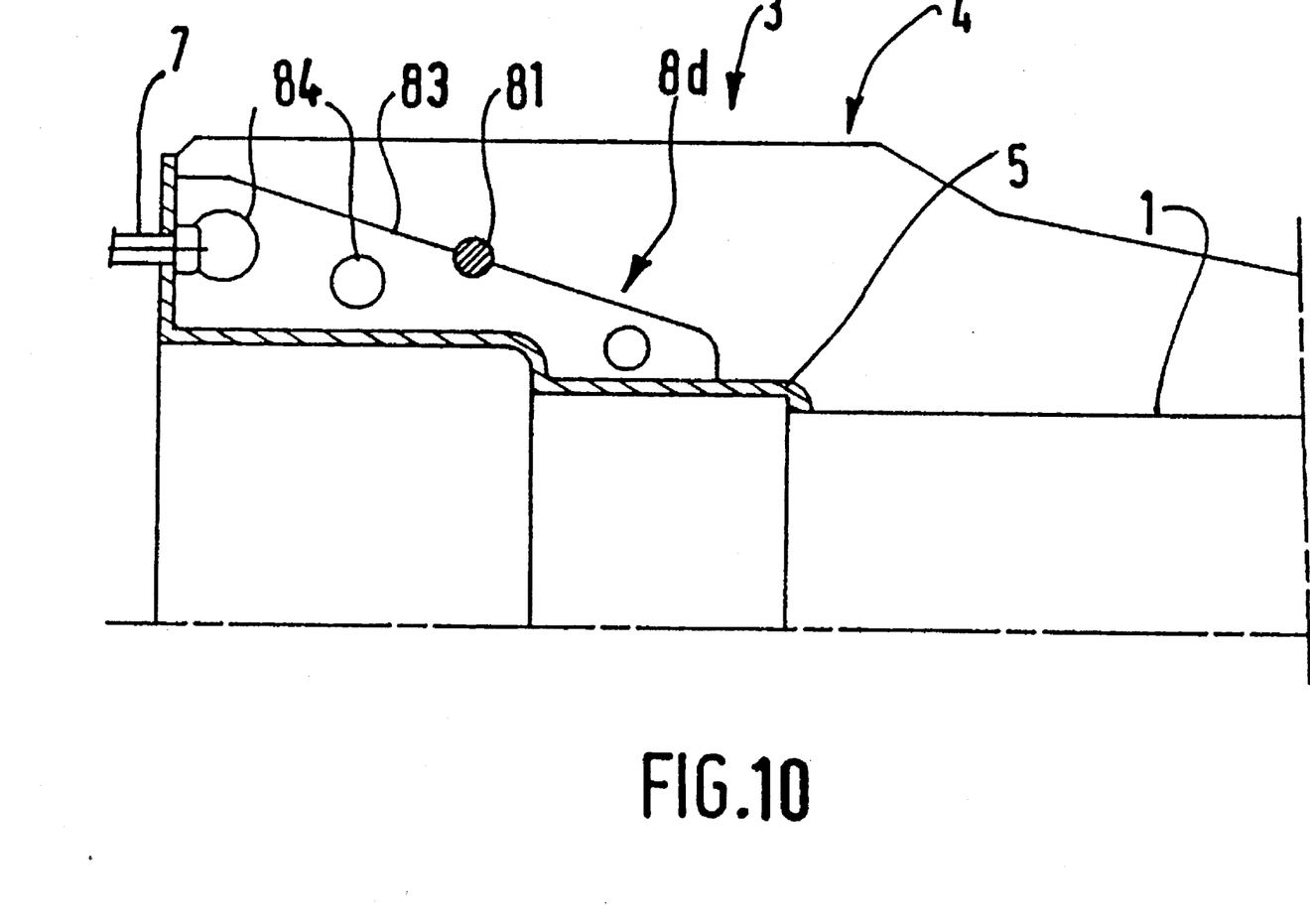
FIG. 10 is a view in partial lengthwise section of a seventh example of embodiment of the stiffener according to the present invention.

FIG. 9 shows the example of a stiffener 3 of FIG. 4b according to the present invention, fitted around a terminal 2 ending a flexible tubular conduit 1. The stiffener 3 of FIG. 10 comprises an insert 5, an internal reinforcement 8 and a bushing 9. The mechanical assembly thus produced is advantageously supplemented by an additional housing member which can take the shape, as in the case of FIG. 2, of a flange 6 which bears, on the one hand, on the terminal 2, forming the housing support with the additional housing member, and on the other hand, on either or both of the two disk-shaped radial members extending the insert 5 and the bushing 9 respectively. The assembly consisting of the reinforcement 8, the bushing 9, the insert 5 and the flange 6 is firmly assembled by virtue of the fastening members 7, for example by tightening a set of screws and nuts, and is solidly anchored to the housing support. The stiffener 3 of FIG. 9 exhibits performance which is superior to the stiffeners of known types. It improves the behavior of the elastic member 4, including the stretched side. There is indeed a stress concentration on the stretched side, in particular where the ring 81 is placed, but a part of the stresses is absorbed by the bushing 9. In addition, the stiffener 3 can be made independently of the elongate body onto which it will be fitted, in hidden time. A possible defect which appears during the production of a stiffener 3 and which is detected before the fitting does not result in the risk of causing damage to the elongate body to be protected. In addition, the stiffener 3 of FIG. 9 can be dismantled for checking or replacement. In order to perform the dismantling the fastening members 7 are uncoupled from the flange 6. The stiffener 3 is moved to the right of FIG. 9, the terminal 2 is dismantled or sectioned and the stiffener 3 is withdrawn. After possible fitting of a new stiffener 3 onto an elongate body 1, the terminal 2 is replaced and the integral attachment of the flange 6 to the fastening members 7 is secured. Alternatively, if need be, it is also possible to replace the stiffener 3 without dismantling or sectioning the terminal, for example by cutting away the elastic member 4 on site in order to remove it and by overmolding a new elastic member. The elastic member 4 of FIG. 9 comprises an extra thickness of the cylindrical part 41 at the housing. The geometry, especially of the elastic member 4, is adapted to the stresses which the stiffener 3 must be capable of withstanding. In a high-performance exemplary embodiment the stiffener 3 of FIG. 10 is fitted around a flexible tubular conduit whose internal diameter is 0.4 m and which comprises an elastic member 4 made of polyurethane whose mass is equal to 800 kg. It can withstand flexural moments resulting from pulls of 64 tonnes, with a deviation of 35° in relation to the axis of the flexible tubular conduit 1. In another exemplary embodiment the stiffener 3 is capable of withstanding flexural effects resulting from a pull of 120 tonnes at an inclination of 20° relative to the axis of the flexible tubular conduit 1. In both cases the maintenance of this performance is guaranteed for a period of 20 years but the stiffener according to the invention can also be employed in cases where the applied stresses and/or the dimensions of the elongate body are smaller, for example in the case of a flexible conduit which has an external diameter of the order of 2 cm.

FIG. 10 shows another embodiment of a stiffener according to the present invention, comprising a reinforcement 8d comprising radial ribs 83 in the shape of elongate gusset plates advantageously uniformly distributed over 360°. The radial ribs 83 advantageously support, for example, a ring 81, for example toroid, it being possible for the ribs 83 and the ring 81 to be advantageously made of metal, for example steel.

The radial ribs 83 advantageously comprise openings 84 allowing polyurethane to pass through so as to ensure the continuity of the polyurethane mass in the circumferential direction around the elongate body 1.

In the example illustrated in FIG. 10 the ribs, which are firmly anchored to the housing support by means of the fastening members 7 are integrally attached to the insert 5.

It is obvious that the ring 81 can assume the section illustrated in FIG. 6 without departing from the scope of the present invention. Similarly, it is possible to employ a plurality of rings 81 which are placed preferably at the periphery of the ribs 83.

Figure 11:
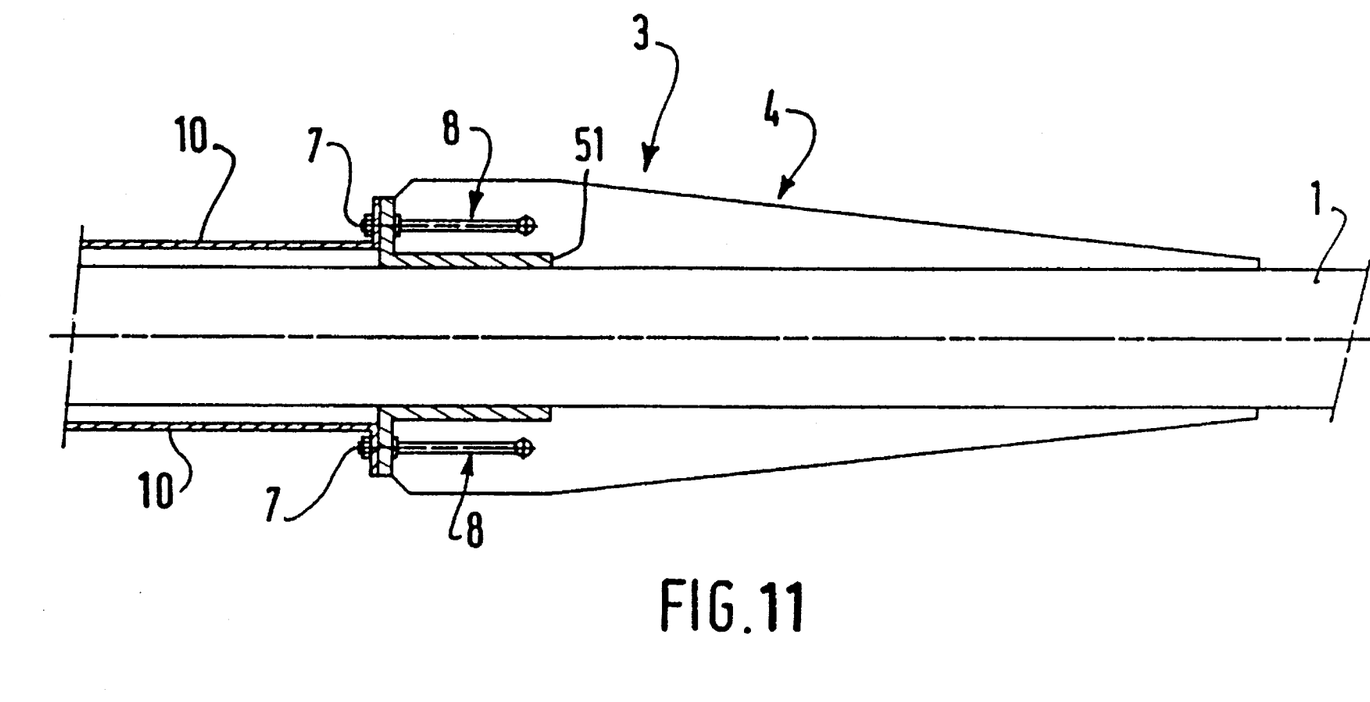
FIG. 11 is a view in axial section of an eighth example of embodiment of a stiffener according to the present invention, fitted on a conduit.
Figure 12:
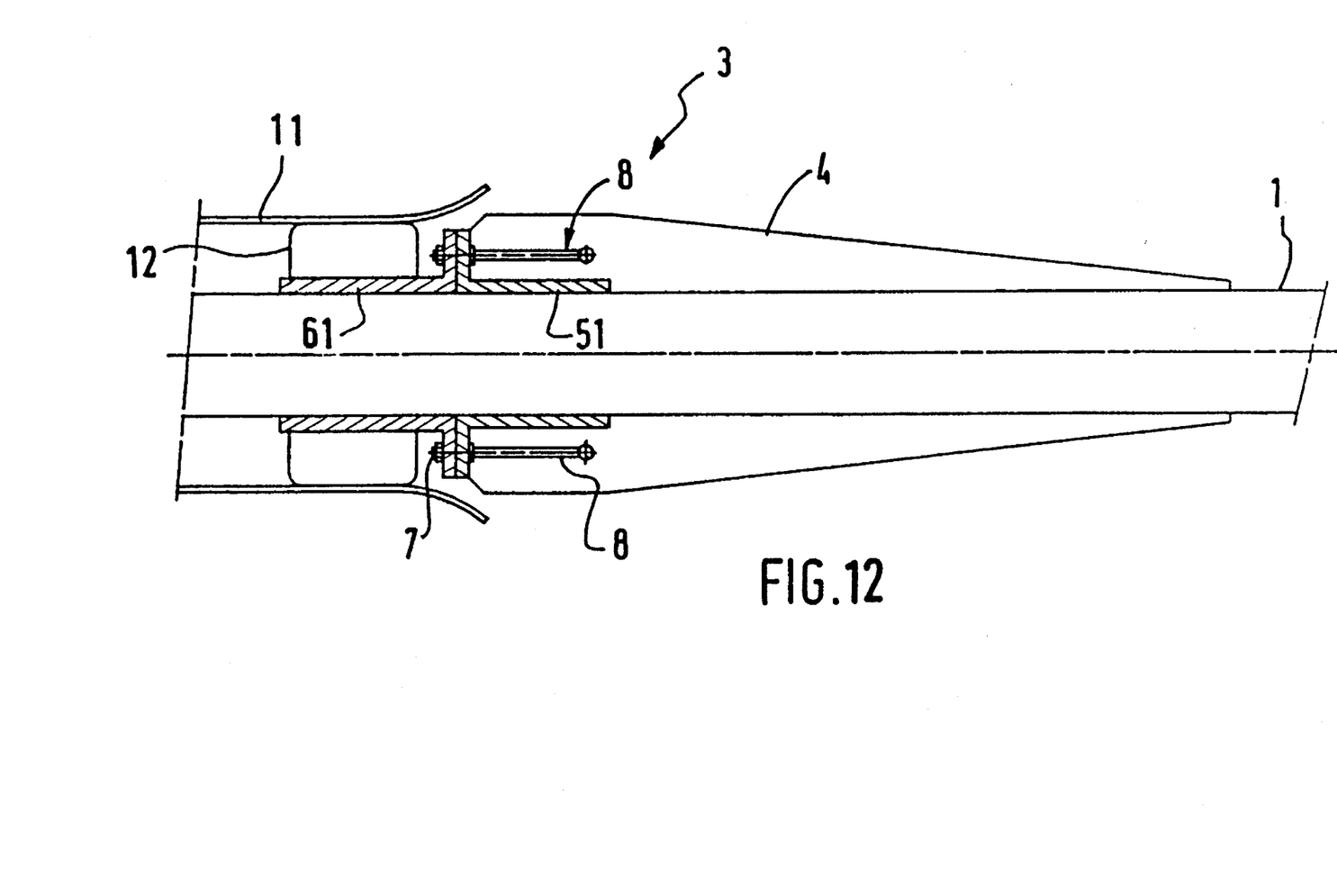
FIG. 12 is a view in axial section of a ninth example of embodiment of a stiffener according to the present invention, fitted on a conduit.
Figure 13:
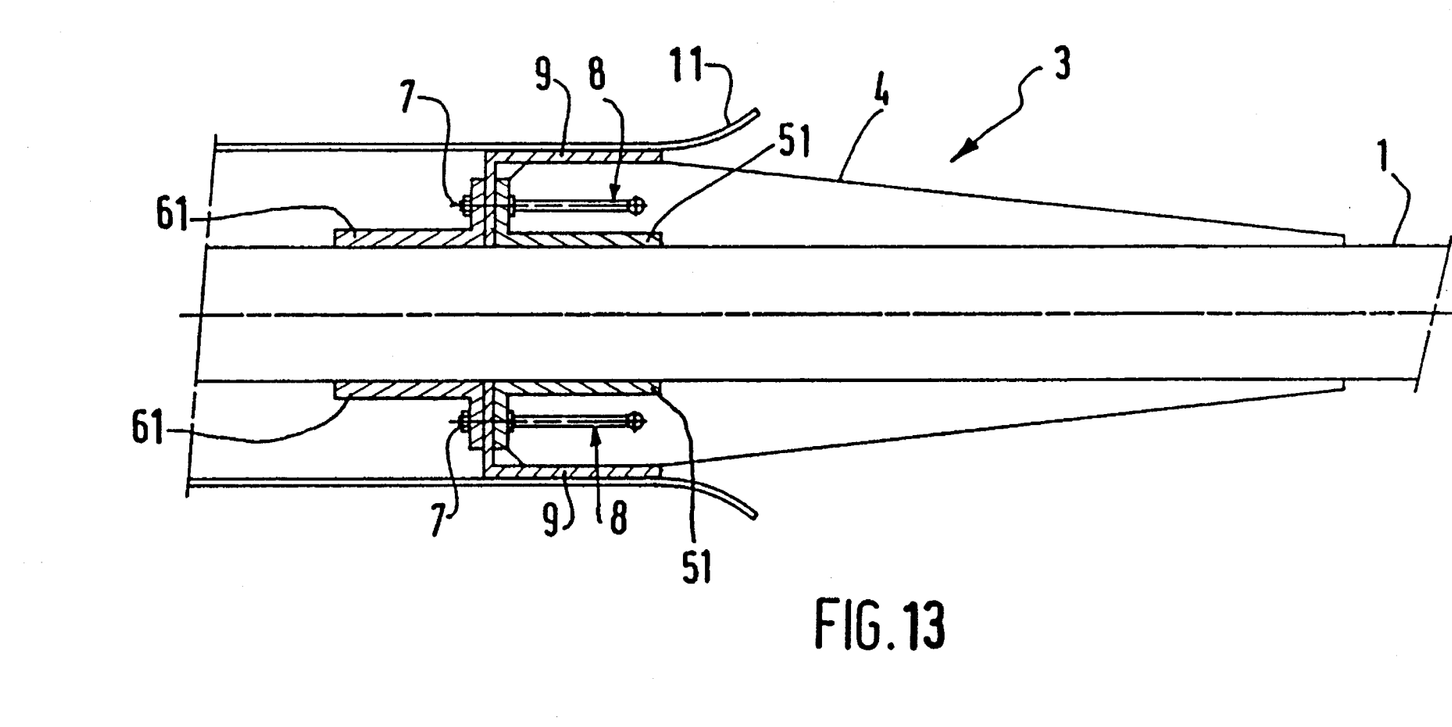
FIG. 13 is a view in axial section of a tenth example of embodiment of a stiffener according to the present invention, fitted on a conduit.

The stiffener according to the present invention is not necessarily arranged at the end of an elongate body 1. In such a case, terminals may not be available in order to produce the housing of the stiffener 3 according to the present invention. Such cases of figures are illustrated in FIGS. 11, 12 and 13. A terminal is located, for example, upstream, at a distance of a few meters or a few tens or hundreds of meters.

FIG. 11 shows a stiffener 3 according to the present invention, comprising a reinforcement 8 attached to an insert 51 and surrounding with little clearance or with no clearance an elongate body 1, for example a flexible tubular conduit. The reinforcement 8 and the insert 51 are integrally attached by means of the fastening members 7 to the end flange of a straight rigid guide tube 10 which acts here as the housing support. In the case of FIG. 11 the straight guide tube 10 advantageously surrounds the elongate body 1 with a clearance.

FIGS. 12 and 13 correspond to the case of the stiffening of an elongate body 1, for example a flexible tubular conduit leaving a guide tube 11 comprising a widened end part and which may have an internal diameter substantially greater than the external diameter of the elongate body. The guide tube 11 can have any configuration whatever, for example rectilinear and vertical (I tube), or taking the shape, for example, of a circular arc which forms the bottom part of a vertical tube and whose lower end is at any inclination whatever between 0° and 90° in relation to the vertical (J tube).

FIG. 12 shows an alternative form of fitting of a stiffener according to the present invention comprising a reinforcement 8. As in the case of FIG. 11, the reinforcement 8 is integrally attached by fastening members 7 to the insert 51. The housing support consists of the tube 11 and an additional reinforcing member 61 which takes the shape of a flange bearing, on the one hand, on the elongate body 1 and, on the other hand, on a disk-shaped radial member extending the insert 51, and an intermediate housing member 12. The intermediate member 12 being jammed in the annular space which separates the tube 11 and the reinforcing member 61 makes it possible to transmit the radial housing stresses between the stiffener 3 and the tube 11 and consists of a rigid annular component which can, for example, take the shape of a collar which can be separated into a number of components, of the type of the members called a "clamp" in petroleum terminology.

In FIG. 13 the stiffener 3 according to the present invention comprises an external bushing 9 in addition to the reinforcement 8. In this case it is advantageous to perform the housing of the stiffener 3 according to the present invention in the tube 11 by means of the bushing 9, the bushing coming to bear on the inner surface of the tube 11 and being made so as to transmit the radial housing stresses. In the example illustrated in FIG. 13 the reinforcing support also comprises an additional reinforcing member which takes the shape of a flanged tube section 61.

As a general rule, the stiffener according to the invention can be employed every time that an elongate body such as a flexible tubular conduit has a critical region subject to flexing actions which can give rise to an excessive decrease in the radius of curvature, in particular in the case of dynamic effects giving rise to changes in the radius of curvature, for example in a period of swell. A typical case of application relates to the connection of a flexible tubular conduit to a surface platform, a ship, a buoy or any other mobile or stationery structure forming an external support. The stiffener according to the invention can be fitted on the end terminal of the flexible conduit, as illustrated in FIG. 9, the terminal forming the housing support and being, furthermore, integrally attached to the structure forming the external support. Alternatively, a collar clamped around the elongate body can be used as a housing support. FIGS. 11 to 13 illustrate fittings in which the housing support comprises a separate structure such as a rigid steel tube, external to the elongate body and surrounding it, the housing stresses being transmitted directly, for example between the tube and the bushing surrounding the elastic member of the stiffener, or through at least one inserted housing member. In this case on both sides of the stiffener the elongate body has a free first part whose flexing is controlled by its bearing on the active part of the stiffener and a static second part which is integrally attached to the external support.

Whatever the embodiment, the elastic member 4 of the stiffener according to the invention comprises at least one, preferably approximately cylindrical, bearing for support on a rigid member which may be a constituent part of the stiffener or of the housing support. The said bearing may form a part of the inner surface or of the outer surface of the stiffener.

The rigid member on which the elastic member 4 bears can thus, in one case, from a part of the inner wall of the stiffener, such as an insert 5 or 51, or be arranged inside the stiffener, such as a terminal 2 or a collar fitted around the elongate body 1 or, in the other case, form a part of the outer wall of the stiffener, such as a bushing 9, or be arranged outside the stiffener, such as a tube 10 or 11. Thus, for example, the stiffener 3 according to the invention can be housed in a tube 10 or 11 without any terminal or collar fitted onto the flexible conduit being available, and without employing an insert such as 5 or 51 or a bushing 9. In such a case, which is not illustrated, since the elastic member 4 bears directly with its outer cylindrical surface on the housing support 10 or 11, the housing device can comprise an additional annular housing member which has a radial part to which the reinforcement, such as 8, is fastened by fastening members 7, and a cylindrical part housed in the tube 10 or 11 is pointed in a direction opposite to the stiffener 3 in relation to the said radial part. The stiffener 3 advantageously comprises two bearings for support of the elastic member 4, each of these bearing surfaces constitute a portion of the inner and outer surfaces of the elastic member 4 respectively, as illustrated by FIGS. 4, 9 and 13.

However, it does not constitute a departure from the scope of the present invention if the stiffener is arranged between two free parts of the elongate body, each part being mobile and subject to deformations, especially by flexing. For example, this relates to the case where the elongate body is constrained at some point, for example by an external support or by a retaining member such as a cable, or in the case where a particularly heavy member must be attached to the elongate body. In this latter case, because of its inertia, the heavy member then acts as the external support to which the elongate body is connected by the housing of the stiffener in the housing support. Furthermore, the functions of a housing support and of an external support which in this case are dissociated in order to clarify the description can be combined in the same single supporting member.

The invention applies especially to the limitation of the flexing of elongate bodies such as flexible tubular conduits, umbilicals, electrical cables or anchoring cables; it also applies to elongate bodies consisting of the assembly into a bundle of a number of flexible tubular conduits and/or electrical cables or other ducts such as optical fibers, it being possible for the said bundles (for example a multiple riser or an umbilical line) to be made up of assembled parallel lines or of helically assembled lines.

Although the examples described above relate to the case of elongate bodies which have a circular section—the stiffener then preferably has an axially symmetrical configuration—the stiffener according to the invention can be made so as to fit an elongate body of any section, for example elliptical or rectangular (for example in the case of flat bundles) or polygonal. In such a case the stiffener according to the invention can be made so as to have an internal surface which exactly complements the elongate body and, if appropriate, the housing support such as a terminal around which it is arranged, it being possible for the elastic body to have a thickness which can vary in a given section perpendicular to the axis of the elongate body, and it being also possible for the various members of the reinforcement to have a general arrangement and dimensioning which are appropriately adapted so as to obtain the desired flexural characteristics. Alternatively, the stiffener according to the invention can be made being given a general axially symmetrical configuration with an elastic member of revolution; such a device can be produced by inserting means for radial bearing which have an internal surface complementing the external surface, of any kind, of the elongate body and, for example, of the terminal, and an external surface of revolution enclosed by the internal surface of the stiffener, the said means for radial bearing having the characteristic of transmitting the radial stresses while being subjected only to very little deformation.

The invention applies principally to underwater oil production.

What is claimed is:

1. A stiffener comprising an elastic member, made of an elastomer disposed outside a portion of an external surface of an elongate body, said elongate body being integrally attached to one end of a housing support, said stiffener comprising an elastic member made of an elastomer, for limiting flexing of said elongate body, wherein said stiffener comprises, inside said elastic member, a reinforcement extending over a portion of the length of the elastic member from one end, said reinforcement being integrally attached by means for fastening to said housing support.

2. The stiffener as claimed in claim 1, wherein said reinforcement comprises at least one ring integrally attached to the housing support by a plurality of tie rods.

3. The stiffener as claimed in claim 1, wherein said reinforcement comprises at least one sheet of interwoven yarns or ribbons (8a), integrally attached to the housing support.

4. The stiffener as claimed in claim 1, wherein said reinforcement comprises a sleeve (8b) provided with openings (19), the sleeve being integrally attached to the housing support.

5. The stiffener as claimed in claim 1, wherein said reinforcement comprises a loose grid forming a cylindrical crown ring (8c) integrally attached to the housing support.

6. The stiffener as claimed in claim 1, which additionally comprises an external bushing griding said elastic member, said bushing being integrally attached to the housing support.

7. The stiffener as claimed in claim 6, wherein said bushing is integrally attached to the housing support by fastening members which integrally attach said reinforcement to said housing support.

8. The stiffener as claimed in claim 1, which further comprises an insert at the internal periphery of the elastic member, said insert being integrally attached to the housing support.

9. The stiffener as claimed in claim 8, wherein said insert is integrally attached to the housing support by members for fastening said reinforcement to said housing support.

10. The stiffener as claimed in claim 1, for a tubular conduit comprising an end terminal, wherein the housing support includes said terminal.

11. A stiffener as claimed in claim 1, for a flexible tubular conduit fitted with clearance in a rigid tube, wherein the housing support includes said rigid tube (10, 11).

12. The stiffener as claimed in claim 1, wherein the elastic member is made of a moldable elastomer whose Shore A hardness is higher than or equal to 60.

13. The stiffener as claimed in claim 12, wherein the elastic member is made of polyurethane.

14. The stiffener as claimed in claim 1, wherein said reinforcement comprises two concentric sheets of interwoven yarns or ribbons (8a), integrally attached to the housing support.

* * * * *